Patented Aug. 21, 1923.

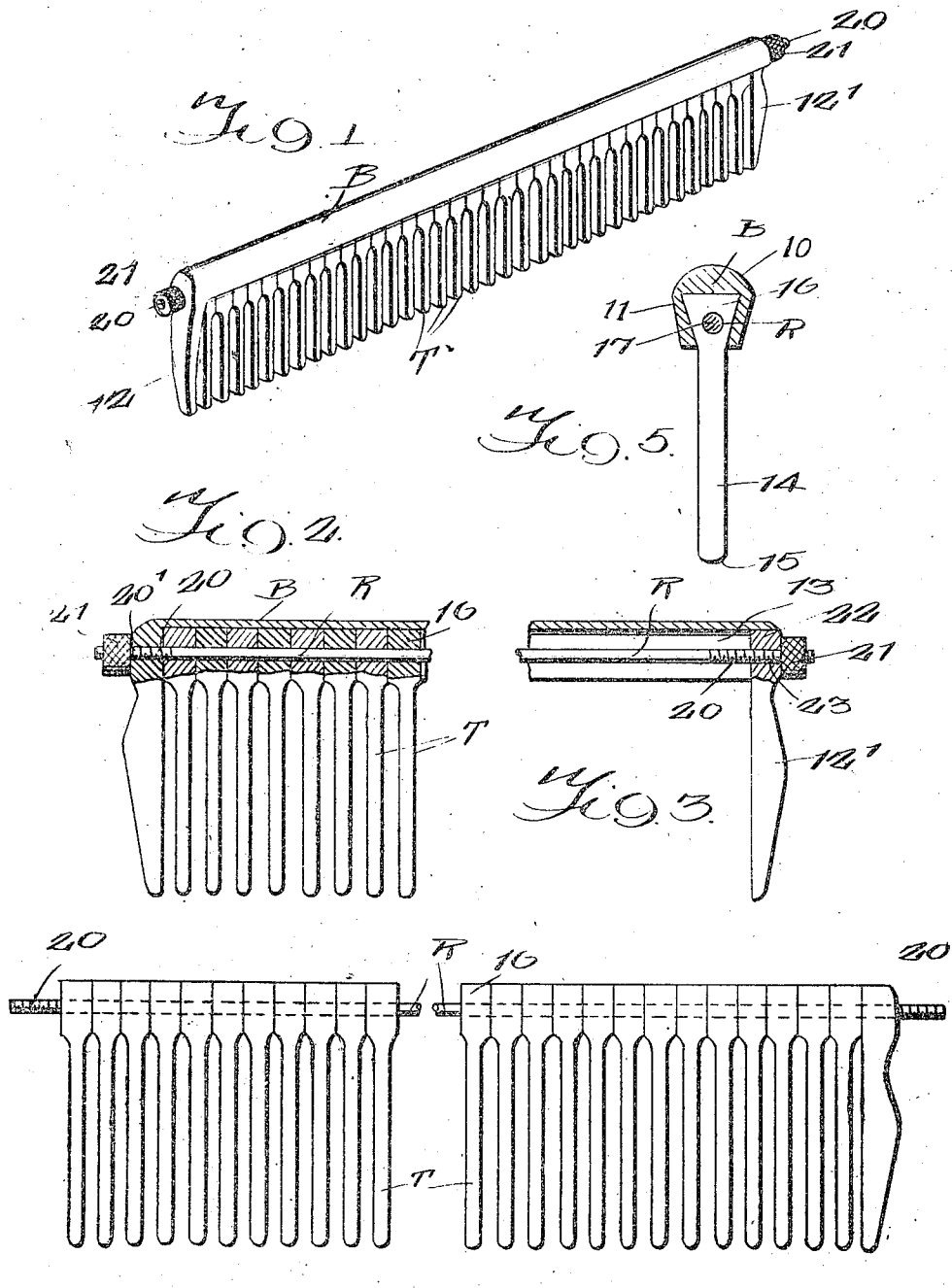

1,465,519

UNITED STATES PATENT OFFICE.

RICHARD B. HOWARD, OF GOLCONDA, NEVADA.

COMB.

Application filed September 16, 1922. Serial No. 588,719.

*To all whom it may concern:*

Be it known that I, RICHARD B. HOWARD, a citizen of the United States, and a resident of Golconda, in the county of Humboldt and State of Nevada, have invented certain new and useful Improvements in Combs, of which the following is a specification.

This invention relates to improvements in combs.

The object of the present invention is to provide a comb constructed in such a manner that the teeth thereof are easily separable to permit an expeditious and efficient cleaning of the comb.

It is also an object of the invention that the teeth be so made and constructed that in case one of the teeth become broken a new one may be easily substituted therefor.

It is also within the scope of the invention that the comb, as a whole, be extremely simple and inexpensive to manufacture.

Other objects, and objects relating to details of construction, combination and arrangement of parts will hereinafter appear in the detailed description to follow.

The invention is illustrated by way of example in the accompanying drawings, in which:—

Figure 1 is a perspective view of a comb constructed in accordance with the present invention.

Figure 2 is a vertical sectional view of an end portion of said comb.

Figure 3 is a similar view of the other end portion of the comb with teeth removed.

Figure 4 is a view in side elevation of the teeth of comb removed from the body member and when arranged upon the clamping rod.

Figure 5 is a transverse sectional view of the comb taken at a point intermediate its ends.

Referring to the drawings more particularly, the comb preferably consists in a body member or back generally indicated by the reference numeral B, said member being elongated, as shown, and may be made of any desirable material, such as hard rubber, an inexpensive metal or composition. The upper edge 10 of the member B is bevelled as shown to an advantage in Figure 5, while the sides 11 thereof slightly taper. The one end of the body member B is preferably formed with an enlarged tooth 12. The body member has its lower edge of face formed with the longitudinally extending groove 13, the inner walls of which converge to a point adjacent the outer edge thereof. The portions 13 of the inner walls are parallel. The groove 13 terminates with the tooth 12 at its one end, while its other end terminates with the corresponding end of the body member B, as shown.

A plurality of comb teeth are provided generally designated by the reference character T. A tooth is specifically shown in Figure 5 of the drawings, and as seen comprises a body portion 14 bevelled at its lower end as at 15 and its upper edge formed with a wedge-like head 16, said head being provided with an aperture 17 extending transversely therethrough with respect to the body portion 14. The head 16 of each tooth is adapted to slide within the groove 13 of the body member B, and due to the particular shape of the heads 16 and the groove 13 the teeth are locked against being lifted from said groove.

A rod R extends through the apertures 17 of the teeth T, said rod being threaded at each end as at 20 and adapted to receive a nut 21. The periphery of each of the nuts 21 is preferably knurled, as shown, in order to facilitate the turning thereof by hand. The one end of the rod R is extended through a suitable opening 20' formed at the end of the body member B which carries the tooth 12.

A second large tooth 12' is provided for the other end of the comb and said tooth having formed therewith a head 22 adapted to slide within the groove 13. This head is also provided with an aperture or opening 23 through which the associated end of the rod R may extend. The nut 21 occurring at the end of rod associated with the tooth 12' is adapted to abut the tooth 12' and in this manner cause the teeth T to be clamped together and held against longitudinal movement upon the rod R. As is obvious either of the nuts 21 may be utilized for clamping the teeth T together.

The comb may be easily assembled or taken apart as may be required. In assembling the comb, the rod R may be positioned in the groove 13 and then the teeth arranged thereon and properly disposed in the groove 13. The tooth 12' is then positioned and the nuts 21, and through the means of the nuts the teeth of the comb may be clamped together. Should dirt collect between the teeth and it is desired to remove the same, then the nuts 21 may be removed and the teeth together with the rod R removed from the body member B. The teeth may now be easily cleaned. Also in case one of the teeth becomes broken a new one may be easily and quickly substituted therefor.

While I have shown and described the preferred form of my invention, I wish it to be understood that I am aware of the fact that the construction, combination and arrangement of parts may be changed by those skilled in the art without departing from the spirit of the invention, as indicated by the appended claims.

I claim:

1. A comb comprising an elongated body member having a groove extending longitudinally thereof, a rod disposed in said groove, means for securing the one end of said rod to the associated end of said body member, a plurality of teeth each having a head provided with an opening adapted for receiving said rod and the head of each tooth being also slidable in the groove of said body member, and means carried by the free end of said rod adapted to be utilized for clamping the teeth upon said rod.

2. A comb comprising an elongated body member terminating at one end in a tooth and having a groove extending longitudinally thereof and in alignment with said tooth, a rod disposed in said groove and secured at its one end to the end of the body member formed with said tooth, a plurality of teeth slidable upon said rod and within said groove, a removable tooth carried at the free end of said rod and adapted to engage the associated end of the body member, and a nut threaded upon the last-named end of the rod whereby the removable tooth may be clamped in position for locking the remainder of the teeth upon said rod.

RICHARD B. HOWARD.